United States Patent

[11] 3,579,263

[72] Inventors: William H. Corbett;
Albert D. Brunell; George M. Koharchik,
Somerset, Pa.
[21] Appl. No. 778,685
[22] Filed Nov. 25, 1968
[45] Patented May 18, 1971
[73] Assignees The DeVilbiss Company;
Champion Spark Plug Company
Toledo, Ohio

[54] ELECTRIC STEAM VAPORIZER
9 Claims, 8 Drawing Figs.
[52] U.S. Cl.................................................. 219/295,
21/119, 128/192, 200/50, 219/272, 219/437,
219/518
[51] Int. Cl......................................................... H05b 3/60
[50] Field of Search........................................... 219/284—
—295, 271—276, 437, 439, 435, 518, 337, 523,
541; 99/358; 128/186, 192; 200/50 (Exam);
21/119

[56] References Cited
UNITED STATES PATENTS
671,139  4/1901  Leask.......................... 219/437
1,717,040  6/1929  Kaufman et al.............. 219/272
2,642,794  6/1953  Spiess et al................... 99/358
2,711,474  6/1955  Krichton...................... 219/523(UX)
2,810,381  10/1957  Knight......................... 219/272X
2,924,167  2/1960  Rhodes......................... 99/358X
3,020,385  2/1962  Conlin et al. ................ 219/272
3,467,816  9/1969  Wahlberg..................... 219/437

FOREIGN PATENTS
709,620  5/1931  France......................... 219/439
585,755  10/1933  Germany...................... 219/439

Primary Examiner—A. Bartis
Attorney—Owen & Owen

ABSTRACT: An electric steam vaporizer having a liquid reservoir and a removable top. A post member is mounted on the upper part of the liquid reservoir. The top has an opening in one side which receives the post member when the top is placed on the reservoir. The post member actuates a switch which closes an electrical circuit to the vaporizer electrodes. The post also mechanically locks the top to the reservoir thus minimizing possible heated water injuries in the event of vaporizer overturning.

Patented May 18, 1971
3,579,263
2 Sheets-Sheet 1
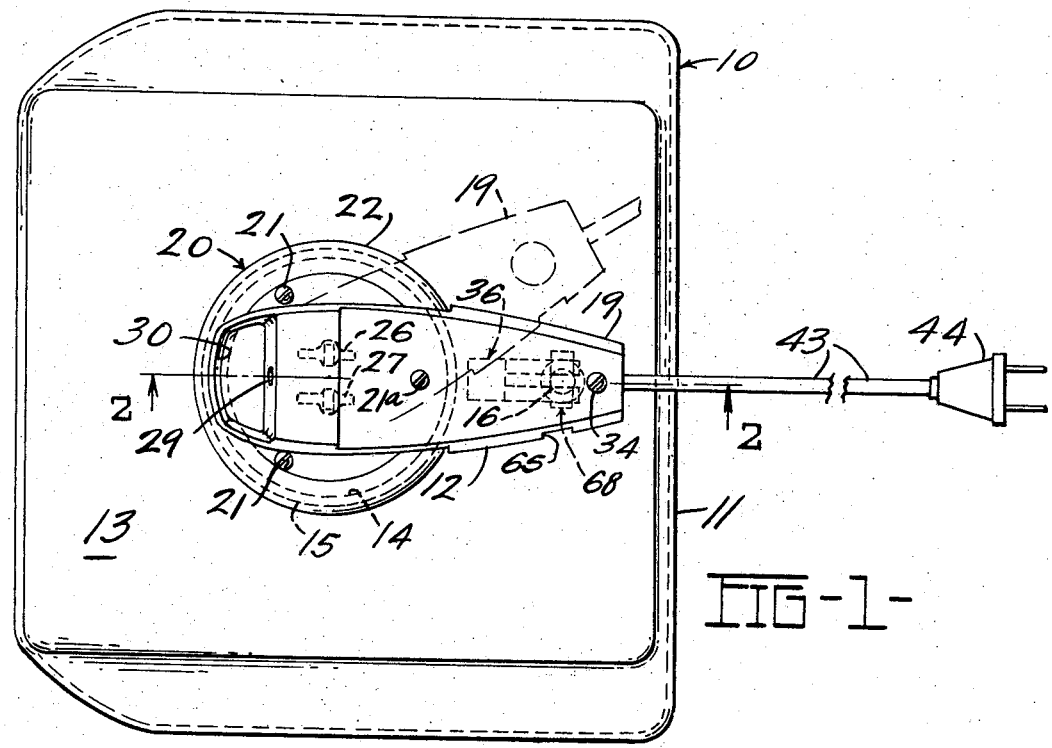
FIG-1-
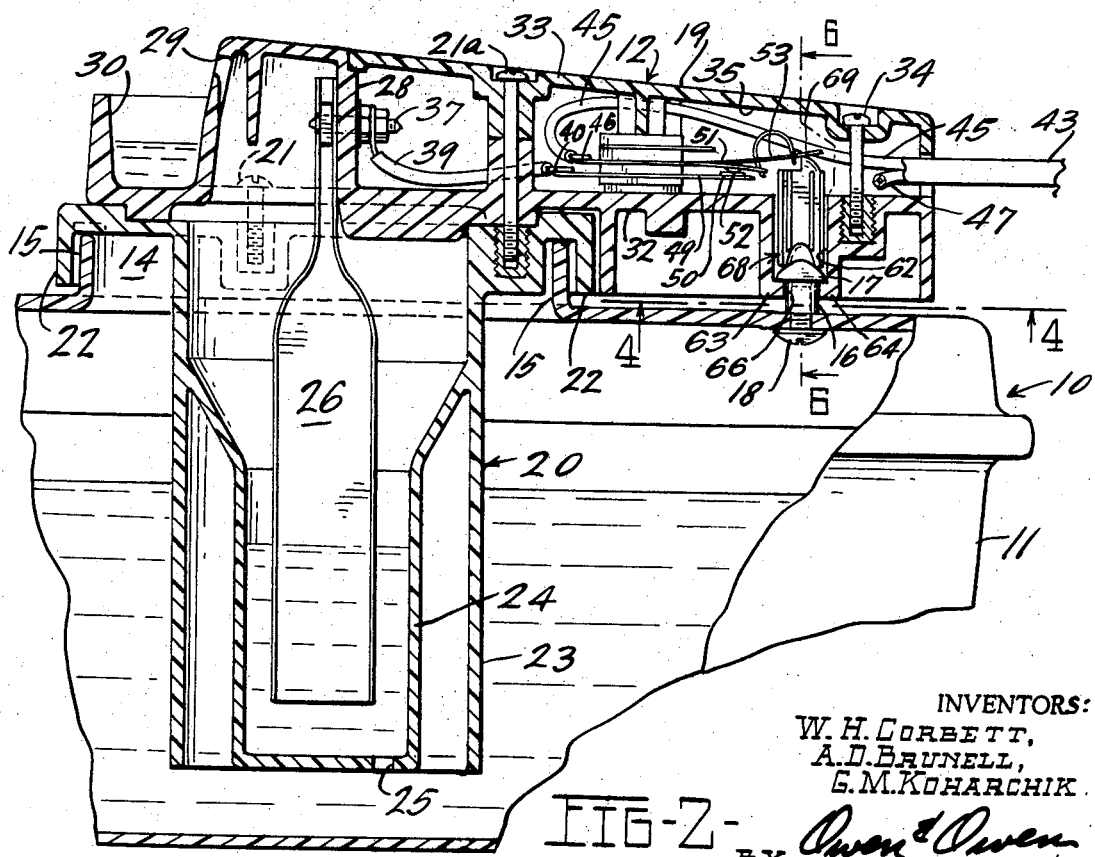
FIG-2-
INVENTORS:
W. H. CORBETT,
A. D. BRUNELL,
G. M. KOHARCHIK.
BY Owen & Owen
ATT'YS.

Patented May 18, 1971
3,579,263
2 Sheets-Sheet 2
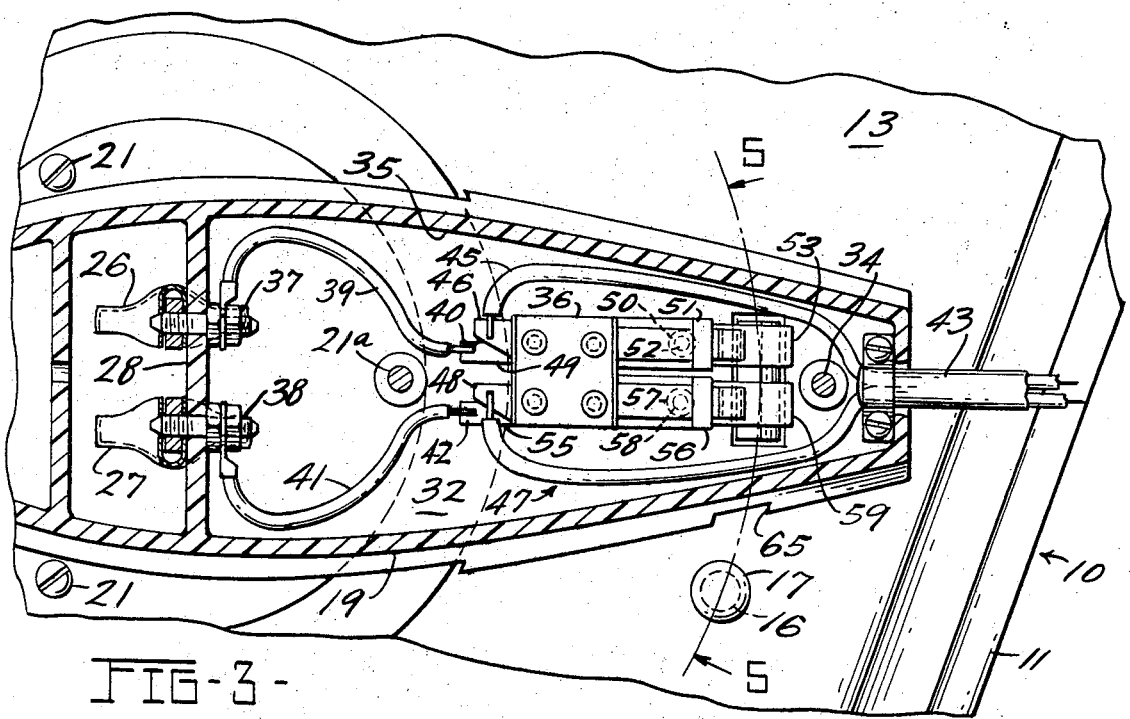
FIG-3-
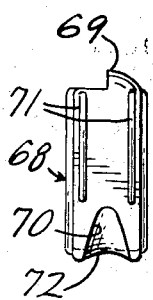
FIG-7-
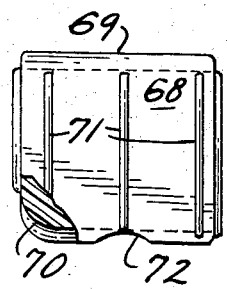
FIG-8-
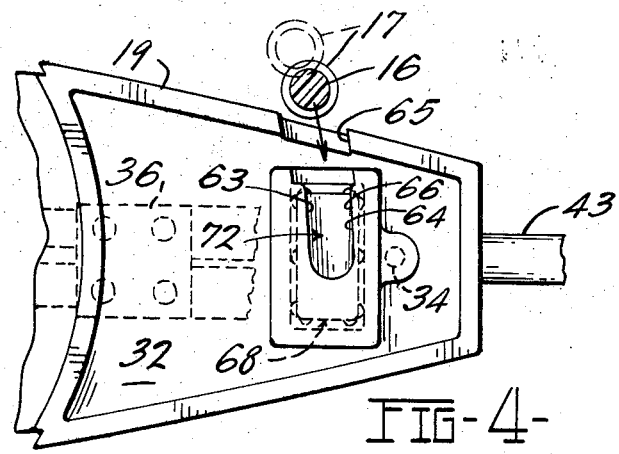
FIG-4-
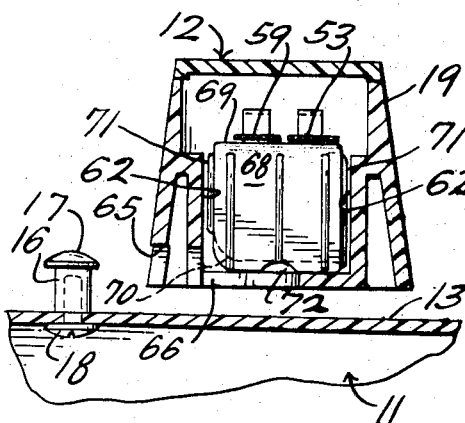
FIG-5-
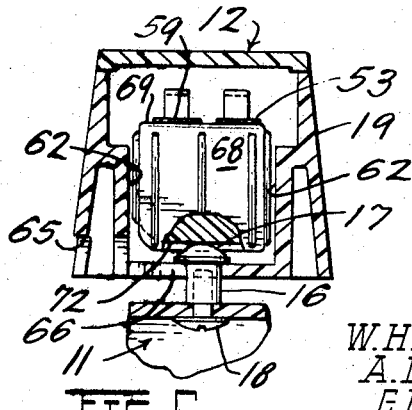
FIG-6-
INVENTORS:
W.H. CORBETT,
A.D. BRUNELL,
G.M. KOHARCHIK.
BY Owen & Owen
ATT'YS.

ELECTRIC STEAM VAPORIZER

BACKGROUND OF THE INVENTION

This invention is directed to an electric steam vaporizer, and particularly to an electric steam vaporizer which has an electrical safety device and an overturning safety device.

Steam vaporizers of the general type contemplated by the present invention are adapted to provide a steam vapor alone or in combination with a vaporized medicament. Such vaporizers are used in sick rooms to relieve colds, bronchitis, and other respiratory ailments. Often, such vaporizers are used in the home, for example, in the bedrooms of small children.

The heating element of electrical steam vaporizers generally extends downwardly from the top of the vaporizer into the vaporizer reservoir. The heating element is in heating relationship with water or other liquid which is to be vaporized. Because of the electrical circuit and the presence of water, the hazard of an electrical shock is present. This hazard is reduced by placing the heating element in a protective sleeve which permits the water to contact the heating element but which minimizes the electrical hazard to the operator. However, such a protective sleeve must be readily removable to permit the removal of deposits which accumulate on the heating element. Therefore, even with a protective sleeve, an electrical hazard remains whenever the power source is electrically connected to the heating element while the sleeve is removed for cleaning purposes.

Another problem encountered with many vaporizers is that the temperature of the water within the reservoir becomes very hot after prolonged use. Vaporizers of this general type are expected to operate continuously for as long as 12 hours without refilling. It is not unusual for the water temperature of the water exterior of the heating or boiling chamber to approach scalding temperatures after long periods of operation because of the constant application of heat to the unit. Accidental overturning of the vaporizer, particularly by small children, presents an additional safety hazard.

SUMMARY OF THE INVENTION

The present invention comprehends an electric steam vaporizer having a liquid reservoir and a removable top. A post member is mounted on the upper portion of the liquid reservoir. The top has an opening in one side which receives the locking member when the top is placed on the reservoir. The post member actuates one or more switches which close an electrical circuit to the heating element. In the present invention, the heating element consists of two depending electrodes which extend into the liquid held in the reservoir and which are electrically connected through switching means to an electrical plug which is suitable for connection to a power source. Whenever the top is removed from the vaporizer reservoir, the switching means is actuated and the circuit to the electrodes is opened, thereby reducing the possibility of an electrical shock to a careless operator.

The present invention also contemplate a mechanical locking arrangement between the liquid reservoir and the vaporizer top. When the top is placed in operating position, a head on the upper end of the post rests on a pair of receiving flanges within the vaporizer top. In addition, an upstanding lip on the reservoir mates with a depending flange on the top restricting relative lateral movement between these parts. If the vaporizer is overturned, the locking arrangement holds the top on the reservoir and prevents large quantities of heated water from being thrown outwardly.

It is a primary object of this invention to provide an electric steam vaporizer having a novel and improved electrical switching mechanism which opens an electrical circuit to the heating element whenever the vaporizer top is removed from the reservoir.

It is a further object of the present invention to provide an electrical steam vaporizer having a mechanical interlock between the vaporizer top and the reservoir which minimizes the escape of heated water from the reservoir in the event of accidental vaporizer overturning.

Other objects of this invention will become apparent from the following detailed description of a preferred form of the invention, reference being had to the accompanying drawings.

BRIEF DESCRIPTION OF THE DRAWINGS

FIG. 1 is a plan view of an electric steam vaporizer constructed according to the present invention, and showing in dashed lines the position of the vaporizer top as it is placed upon the vaporizer reservoir;

FIG. 2 is an enlarged, fragmentary, sectional view taken along the line 2-2 of FIG. 1;

FIG. 3 is a fragmentary, partially sectional, plan view of the vaporizer shown in FIG. 1;

FIG. 4 is a fragmentary, bottom view of a portion of the vaporizer top shown in FIG. 3;

FIG. 5 is a fragmentary, sectional view taken along the line 5-5 of FIG. 2 and showing the electrical-switching means in its open position;

FIG. 6 is a fragmentary, sectional view similar to FIG. 5 and showing the switching means in its closed position;

FIG. 7 is an end view of the switch plunger member; and

FIG. 8 is a side view of the switch plunger member shown in FIG. 7.

DESCRIPTION OF THE PREFERRED EMBODIMENT

Referring to FIGS. 1 and 2, an electric steam vaporizer according to the present invention is generally indicated by the reference number 10. The vaporizer 10 includes a base or liquid reservoir 11 and a cover or top 12. In the present embodiment, the reservoir includes a generally horizontal upper surface 13 which has a circular liquid opening 14. Referring to FIG. 2, an integral upstanding lip 15 surrounds and defines the liquid opening 14. A post member 16 having an enlarged head 17 is vertically mounted on the upper surface 13 of the reservoir 11 and is held in place by a screw 18.

The top 12 includes a longitudinally extending cover member 19 and a depending protective sleeve assembly 20 which is connected to the cover 19 by a plurality of screws 21.

The protective sleeve assembly 20 includes a downwardly directed flange 22 which is concentric with and of a slightly larger diameter than the upturned lip 15 of the reservoir 11. The protective sleeve assembly 20 also includes an outer wall member 23 and an inner boiling chamber 24. The boiling chamber 24 has a liquid opening 25 in its bottom, which allows entry of liquid into the boiling chamber 24 from the reservoir 11.

Referring to FIG. 2 and FIG. 3, a pair of electrodes 26 and 27 are mounted on a vertical wall 28 of the cover member 19. The electrodes 26 and 27 depend downwardly into the boiling chamber 24. The cover member 19 also includes a steam opening 29 which is in communication with the boiling chamber 24 and a medicament well 30 (see FIG. 1) is located immediately below the steam opening 29.

Referring to FIG. 2, the top 12 includes a bottom member 32 and an electrical cover plate 33 which is removably attached to the bottom member 32 by the screw 21a and a screw 34. When the plate 33 is in position on the bottom member 32 an electrical cavity 35 is defined between the bottom member 32 and the plate 33. As best seen in FIG. 3, a switch 36 is positioned within the cavity 35. A pair of terminal pins 37 and 38 extend through the wall 28 and are electrically connected to the electrodes 26 and 27, respectively. An electrical conduit or wire 39 extends between the terminal pin 37 and a first terminal 40 of the switch 36. Similarly, a conduit or wire 41 extends between the terminal pin 38 and a second terminal 42 of the switch 36. Referring to FIGS. 1 and 3, a power cord 43 having an electrical plug 44 at one end has another end which extends into the cavity 35 of the top 12. The plug 44 is suitable for connection to an electrical outlet or other power source.

While the electrical plug 44 is depicted in the present embodiment as being a two-prong plug, it can, of course, be of varying prong configurations depending upon the power supply to which it is connected.

In the present embodiment, the power cord 43 is a two conduit cord having one conduit or wire 45 attached to a third terminal 46 of the switch 36 and another conduit or wire 47 attached to a fourth terminal 48 of the switch 36. Referring to FIG. 2, the first terminal 40 is an integral part of a lower switching blade 49 having a contact 50 at one end. Similarly, the third terminal 46 is an integral part of an upper switching blade 51 having a complementary contact 52 at one end which is in electrical relationship with the contact 50. The upper switching blade 51 includes an overcenter leaf 53 at its outer end.

Similarly, the second terminal 42 is an integral part of a lower switching blade 55 and the fourth terminal 48 is an integral part of an upper switching blade 56. The upper and lower switching blades 56 and 55 have a pair of complementary contacts 57 and 58 and the upper switching blade 56 also has an overcenter leaf 59. The overcenter leaves 53 and 59 of the switch 36 bias the contacts 50—52 and 57—58 into a normally open position when the top 12 is removed from the reservoir 11 of the vaporizer 10.

Referring to FIGS. 2, 5 and 6, the bottom member 32 of the cover member 19 defines a plunger channel 62 having inturned flanges 63 and 64 at its lower end. The top 12 also has a side opening 65 which serves as an entrance throat for the plunger channel 62. The two inturned flanges 63 and 64 define a slot 66 which has a width slightly larger than the post member 16. Referring to FIG. 2, when the post member 16 passes through the side opening 65 and into the slot 66 the enlarged head 17 of the post member 16 rests upon the upper surface of the inturned flanges 63 and 64.

In the present embodiment, when the top 12 is placed on the reservoir 11 and the post 16 positioned within the side opening 65, the relationship of the upturned lip 15 of the reservoir 11 and the depending concentric flange 22 of the top sleeve assembly 20 is such that relative lateral or horizontal movement between the reservoir 11 and the top 12 is prevented. Also, the enlarged head 17 resting upon the upper surface of the inturned flanges 63 and 64 of the top 12 lockingly resists relative vertical movement between the reservoir 11 and the top 12. The relationship between these parts greatly reduces the hazard involved if the vaporizer overturns.

Referring in particular to FIGS. 7 and 8, a plunger block 68 is shown. The plunger block 68 has a switching blade actuator 69 at its upper end and a camming groove 70 in its lowermost surface. The plunger block 68 also has a plurality of vertical bearing ribs 71 on its outermost surfaces and a laterally extending groove 72 which is in communication with the camming groove 70.

Referring to FIGS. 2, 5 and 6, the plunger block 68 is positioned for vertical movement within the plunger channel 62 of the top 12. Referring to FIG. 5, prior to positioning the top 12 on the reservoir 11, the plunger block 68 is in its lowermost vertical position and the switch blade actuator 69 is spaced slightly below the overcenter leaves 53 and 59 of the switching blades 51 and 56, respectively. When the top 12 is positioned on the reservoir 11 the top 12 is rotated and the side opening 65 receives the post member 16. As the post 16 is received by the slot 66 defined between the inturned flanges 63 and 64, the enlarged head 17 of the post member 16 engages the camming groove 70 of the plunger block 68 and moves the plunger block 68 vertically upwardly. When the top 12 and the reservoir 11 are in their engaged position the enlarged head 17 is received in the lateral groove 72 of the plunger block 68 and the blade actuator 69 of the plunger block 68 has pushed the overcenter leaves 53 and 59 upwardly which in turn closes the normally open contacts 50—51 and 57—58. This places the electrical conduits 39—45 and 41—47 (see FIG. 3) into electrical communication with one another and thus closes the circuit between the electrodes 26 and 27 and the power cord 43.

When the top 12 is removed from the reservoir 11, the top 12 is again rotated and the enlarged head 17 of the post member 16 is moved out of its camming relationship with the camming groove 70 of the plunger block 68. As the enlarged head 17 moves out of the side opening 65 the plunger block 68 moves to its lowermost vertical position and the switch 36 returns to its normally open condition (see FIG. 5). Therefore, as long as the top 12 is removed from the vaporizer 11, electrical power is not furnished to the electrodes 26 and 27 even if the electrical plug 44 is attached to a power source. This substantially reduces the chances of an electrical hazard when the protective sleeve assembly 20 is removed for the purpose of cleaning the electrodes 26 and 27.

It has been found that an electric steam vaporizer, according to the present invention, reduces the hazards of electrical shock and accidental scalding.

We claim:

1. An electric steam vaporizer comprising, in combination, a liquid reservoir having an upper surface and a liquid opening defined in said upper surface, a removable top mounted on said liquid reservoir, said top being rotatable relative to said upper surface, heating means depending from said top and extending downwardly through such opening into said liquid reservoir, said top defining a chamber and a side opening in communication with said chamber, electrical-switching means positioned within such chamber, electrical conduit means electrically connected between said heating means and one side of said switching means, a power cord having one end electrically connected to the other side of said switching means and its other end suitable for connection to an electrical power outlet, a vertically movable plunger member mounted in said chamber adjacent said switching means, a vertical post member mounted on such upper surface of said liquid reservoir, said vertical post member engaging and vertically moving said plunger member when said top is positioned on said liquid reservoir and said top is rotated, said vertical post member being received by such side opening, such side opening being of such dimension as to allow said vertical post member to pass therethrough into engagement with the plunger, whereby the vertical movement of said plunger actuates said switching means and closes the electrical circuit to said heating electrodes when said top is positioned on said liquid reservoir.

2. An electric steam vaporizer according to claim 1, wherein said heating means comprises a pair of heating electrodes.

3. An electric steam vaporizer according to claim 2, wherein said upper surface of said liquid reservoir is generally horizontal and such liquid opening defined in such upper surface is circular, an integral lip extending upwardly from said liquid reservoir and surrounding such circular opening, and a generally vertical depending flange on such top which concentrically surrounds said upstanding lip on said liquid reservoir when said top is positioned on said reservoir, said lip on said liquid reservoir and said concentric depending flange on said top resisting relative lateral movement of said top and said reservoir when said top is mounted on said reservoir.

4. An electric steam vaporizer according to claim 1, wherein said top defines a pair of opposed flanges adjacent such side opening for lockingly receiving said post member when said post member is moved through such side opening, said post member having an enlarged head which is received by the upper surfaces of said flanges.

5. An electric steam vaporizer according to claim 4, wherein said plunger defines a camming groove along its lowermost surface, and whereby an upper portion of said post member engages and travels within such camming groove as said top is positioned on said liquid reservoir.

6. An electric steam vaporizer according to claim 4, wherein said switching means includes an electrical switch having two pairs of electrical contacts, a pair of overcenter switching blades, each of said overcenter switching blades being operatively connected to one pair of said electrical contacts, said overcenter switching blades biasing said switch contacts into a normally open position and wherein upward vertical movement of said plunger engages said overcenter switching blades and moves said electrical switch contacts to their closed positions, whereby the electrical circuit to the heating electrodes is closed.

7. An electrical steam vaporizer according to claim 6 wherein a removable cover plate is mounted over such chamber.

8. An electric steam vaporizer according to claim 6, including a protective sleeve assembly depending from said top, said protective sleeve assembly including a cylindrical boiling chamber in surrounding relationship to said heating means and an outer concentric wall member spaced form the boiling chamber.

9. An electric steam vaporizer comprising, in combination, a liquid reservoir having a generally horizontal upper surface and a liquid opening defined in said upper surface, said liquid reservoir having an upstanding lip surrounding said opening, a removable top mounted on said liquid reservoir, said top being rotatable relative to said upper surface, said top including a protective sleeve which extends downwardly into said liquid reservoir and a generally vertical flange which surrounds said lip when said top is positioned on said liquid reservoir, a pair of heating electrodes depending from said top and surrounded by said sleeve, said top defining a chamber and a side opening in communication with such chamber, a normally open electrical switch within such chamber, electrical conduit means electrically connected between said switch and said electrodes, a power cord having one end electrically connected to said switch and its other end suitable for connection to an electrical power outlet, a plunger member mounted for vertical movement within such chamber, said plunger member being operatively positioned adjacent said switch whereby an upward movement of said plunger closes said electrical switch, and a vertical post member having an enlarged head mounted on said horizontal upper surface of said liquid reservoir, said top having a pair of flange members adjacent said side opening for receiving and lockingly engaging said enlarged head when said post member passes through such side opening, said side opening being of such dimension as to allow said vertical post member to pass therethrough into engagement with the plunger, whereby when said top is rotated on said liquid reservoir said post member enters said side opening and forces said plunger member upwardly closing said switch and closing the electrical circuit to said heating electrodes.